United States Patent
Kenchammana-Hoskote et al.

(10) Patent No.: US 6,516,380 B2
(45) Date of Patent: Feb. 4, 2003

(54) SYSTEM AND METHOD FOR A LOG-BASED NON-VOLATILE WRITE CACHE IN A STORAGE CONTROLLER

(75) Inventors: Deepak R. Kenchammana-Hoskote, San Jose, CA (US); Prasenjit Sarkar, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 129 days.

(21) Appl. No.: 09/776,982

(22) Filed: Feb. 5, 2001

(65) Prior Publication Data

US 2002/0108017 A1 Aug. 8, 2002

(51) Int. Cl.⁷ ............................................. G06F 12/00
(52) U.S. Cl. ............................ 711/3; 711/113; 711/143
(58) Field of Search .............................. 711/3, 113, 143

(56) References Cited

U.S. PATENT DOCUMENTS 5,787,242 A * 7/1998 DeKoning et al.
6,148,368 A * 11/2000 DeKoning .................. 711/113
6,185,663 B1 * 2/2001 Burke ........................ 711/156

* cited by examiner

Primary Examiner—Jack A. Lane
(74) Attorney, Agent, or Firm—John L. Rogitz

(57) ABSTRACT

A computer-implemented method and system for accelerating writes to a storage controller by performing log-based sequential write caching of data to be written on a storage device. The data in the log is moved to the storage array later when the system is less active. As a result, random writes are converted to sequential writes. Overall, performance improves since the performance of sequential writes far exceeds that of random writes. A write command containing data is received in a data storage controller, wherein the data storage controller includes a write cache having a sequential log. The data storage controller also includes an index structure indicating the location of data in the sequential log. If the data does not already exist on the log, the data is written to the log contained in the write cache at a location recorded in the index structure. If the data already exists on the log as indicated by the index structure, the data on the index structure is invalidated and the new data is written on the log at an available location determined by the index structure. When an idle period exists, data in the log from a plurality of write commands is transferred to the data storage medium.

27 Claims, 5 Drawing Sheets

SYSTEM AND METHOD FOR A LOG-BASED NON-VOLATILE WRITE CACHE IN A STORAGE CONTROLLER

BACKGROUND OF THE INVENTION

1. Field of the Invention

The present invention relates generally to techniques for storing data, and more particularly to systems and methods for accelerating writes to a storage controller by performing log-based sequential write caching of data to be written on a storage device.

2. Description of the Related Art

There has been an increasing demand for access to high performance and fault-tolerant data storage to keep pace with advances in computing infrastructures. While the cost of storage devices such as hard disk drives (HDDs) have been plummeting due to manufacturing improvements, the cost of managing storage has risen steadily. Storage management has become critical to many enterprises that rely on online access to operational and historic data in their day-to-day business operations.

However, HDDs are prone to failure of their electromechanical components. Hence, storage systems that include many HDDs need to have redundancy built into them, to avoid data loss when an HDD fails. One popular technique for avoiding the loss of data when a HDD fails is known as Redundant Array of Independent Disks (RAID), which is a class of algorithms that store data redundantly on an array of HDDs. Since RAID algorithms add redundancy to user data and decide data layout on the HDDs, they are executed on dedicated hardware in order to free the host processor-memory complex from the task of executing these algorithms.

The hardware executing RAID algorithms typically includes a dedicated processor and memory, as well as Application Specific Integrated Circuits (ASICs), which perform Exclusive OR (XOR) parity calculations, protocol processing, etc. A host machine communicates with this hardware either through the system bus (in which case the hardware is called a RAID adapter) or via a storage interconnect like Small Computer System Interface (SCSI) (in which case the hardware is called a RAID controller). HDDs connected to the controller are mapped to logical drives that are created via configuration commands sent to the controller by an application. A logical drive is a storage extent that is externalized by the controller to its host and resembles and extent on a HDD. The RAID controller, depending on the RAID level chosen for a logical drive, decides the location and the need to update redundant data.

There are a number of different RAID algorithms, the more popular including RAID-0, RAID-1 and RAID-5. All RAID algorithms employ data striping, which interleaves bytes across multiple drives so that more than one disk can read and write simultaneously. RAID-0 logical drives have data striped across a set of HDDs, called an array. A RAID-0 drive has very good read and write performance, since it attempts to parallelize accesses across all HDDs. However, since there is no data redundancy, a failure of any HDD can lead to data loss. In RAID-1 logical drives every chunk of data is mirrored on two separate HDDs. The presence of redundant data allows the controller to recover user data even when a single HDD fails. While the read performance of a RAID-1 drive is very good, the write performance suffers since every update needs to be propagated to its mirror location too. Further, the high level of data redundancy leads to low capacity utilization.

In an effort to balance capacity utilization and performance, RAID-5-logical drives protect a set of chunks of data to be stored on independent HDDs by computing and storing parity information for that set on a separate HDD. Parity information is derived by calculating the data in two different drives and storing the rest on a third drive. The location of the parity information is distributed across the array to balance the load.

One example of a RAID-5 configuration is shown in FIG. 1. A set of chunks of data, comprising ABCDEF, is striped across three different hard drives 10, 12 and 14. When one HDD fails, the RAID-5 logical drive can reconstruct the chunk lost using the remaining chunks. While a RAID-5 drive makes efficient use of the array capacity, it suffers from the performance overhead of having to read, compute, and update parity on every write. Some optimizations are possible on large writes, but when the workload is dominated by small random writes, the performance of a RAID-5 drive suffers.

Two advances have made the RAID-5 organization popular; (1) the presence of write caches in the controller (deferring the delays due to parity updates to a later time, and (2) hardware assist for parity computation via ASICs. While these two innovations have significantly boosted RAID-5 logical drive performance, they do not eliminate the additional work that must be done to maintain the parity in synchrony on any update. Workloads that tend to be small-sized, write dominated, and bursty expose limitations of such improvements for RAID-5 arrays. As the cache size has increased, (servers with 2–8 GB are not uncommon), the I/O traffic generated to the controller resembles such workloads. Since the caches upstream are so large most of the uncommitted working data is kept in them for as long as necessary. When dirty data is flushed to the controller, it is seldom re-used within a short period of time; hence, there is seldom a need to move the same data in and out of the controller. Cache flushes generated by the OS/database kernel tend to be bursty (when pages must be evicted quickly to make room for new data) and random. Thus, being able to handle bursty traffic efficiently becomes highly desirable to end-users. Another consequence of large caches upstream is that there is high variance in the workloads to the controller resulting in periods of intense load followed by light or idle load.

The weaker performance of RAID-5 drives under small-to-medium sized, write dominated and bursty workloads is a consequence of the additional work that needs to be done to update parity information. Under such a workload, each RAID-5 write generates three additional I/Os and at least two additional cache pages. This is because both the data and the associated parity must be computed and updated on HDDs. Once the cache fills up, the controller becomes limited by the flush rate, which suffers from a high overhead due to parity update. When the workload has long bursts of random write traffic, the write cache can provide good response times initially but over time the response time deteriorates as the cache fills up.

In view of these considerations, a system and method is needed to improve the performance of a storage controllers, such as HDD controllers using RAID-5 logical drives, under a workload that is dominated by small-to-medium sized random writes.

The present invention has carefully considered the above problems and has provided the solution set forth herein.

SUMMARY OF THE INVENTION

A system and computer-implemented method for accelerating writes to a storage controller by performing log-based sequential write caching of data to be written on a storage device. The data in the log is moved to the storage array at a later time when the system is less active. As a result, random writes are converted to sequential writes. Overall, performance improves since the performance of sequential writes far exceeds that of random writes.

In one aspect of the invention, a method for storing information on a data storage medium that includes the following steps. A write command containing data is received in a data storage controller, wherein the data storage controller includes a write cache having a sequential log. The data storage controller also includes an index structure indicating the location of data in the sequential log. If the data does not already exist on the log, the data is written to the sequential log at a location recorded in the index structure. If the data already exists on the log as indicated by the index structure, the data on the index structure is invalidated and the new data is written on the log at an available location determined by the index structure. When an idle period exists, data in the log from a plurality of write commands is transferred to the data storage medium.

In another aspect of the invention, a system for storing information on a data storage medium includes a data controller that includes a write cache having a sequential log wherein the data controller also includes an index structure indicating the location of data in the sequential log. In addition, the system includes a means for receiving a write command containing data and a means for determining if the data already exists on the log. If the data does not already exist, the data in the write command is written on the log at a location recorded in the index structure. Furthermore, there is a means for invalidating the data on the index structure and writing the new data on the log at an available location determined by the index structure, if the data already exists on the log as indicated by the index structure. A means for determining if a migration condition exists is also included, wherein, if the migration condition exists, the data in the log from a plurality of write commands is transferred to the data storage medium.

The details of the present invention, both as to its structure and operation, can best be understood in reference to the accompanying drawings, in which like reference numerals refer to like parts, and in which:

DETAILED DESCRIPTION OF THE PREFERRED EMBODIMENTS

Figure 1:
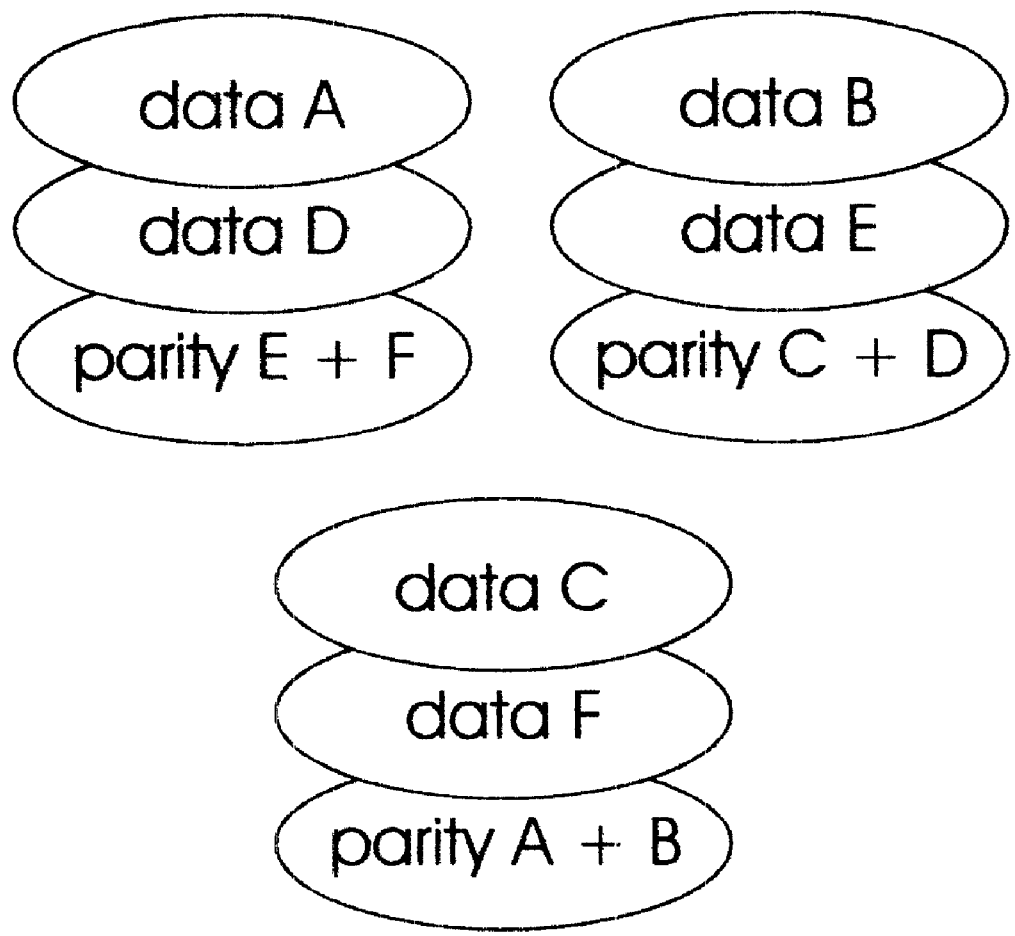
FIG. 1 shows a diagram of a RAID-5 logical drive configuration for data striping and fault tolerance in accordance with the prior art.
Figure 2:
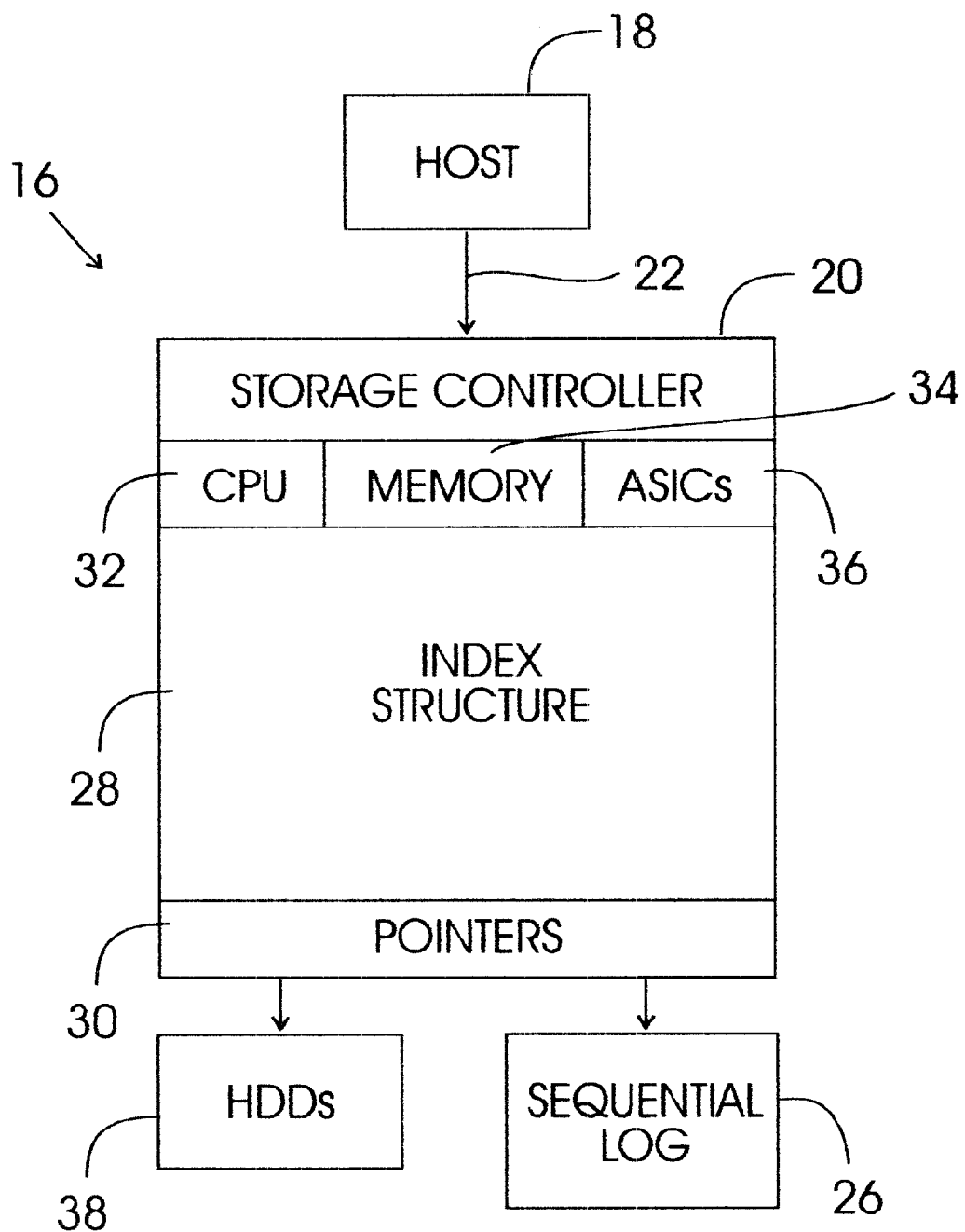
FIG. 2 shows a block diagram of the main components of the data storage controller in accordance with one embodiment of the invention.

Referring initially to FIG. 2, a computer system is shown, generally designated 16, for enabling sequential write caching of data. A host computer 18 can include one or more input devices (not shown) such as a keyboard and/or voice input, and an output device (not shown) such as a monitor, printer, other computer, or computer network. The host computer 18 can be any one of a variety of devices, such as a desktop personal computer made by International Business Machines Corporation (IBM) of Armonk, N.Y., a laptop computer, mainframe computer, or any other suitable processing apparatus. Likewise, other input devices, including point and click devices, keypads, trackballs, and voice recognition devices can be used, as can other output devices.

In any case, the host 18 accesses a data storage controller 20 to undertake the logic of the present invention, which may be executed by a processor in the storage controller as a series of computer-executable instructions. The instructions may be contained on a data storage device with a computer readable medium, having a computer usable medium with code elements stored thereon. Or, the instructions may be stored on random access memory (RAM) of the storage controller 20, on a DASD array, or on magnetic tape, conventional hard disk drive, electronic read-only memory, optical storage device, or other appropriate data storage device. In an illustrative embodiment of the invention, the computer-executable instructions may be lines of C++ code.

Indeed, the flow charts herein illustrate the structure of the logic of the present invention as embodied in computer program software. Those skilled in the art will appreciate that the flow charts illustrate the structures of computer program code elements, including logic circuits on an integrated circuit, that function according to this invention. Manifestly, the invention is practiced in its essential embodiment by a machine component that renders the program code elements in a form that instructs a digital processing apparatus (that is, a computer) to perform a sequence of function steps corresponding to those shown.

The host computer 18 is connected to the data storage controller 20 through a storage interconnect 22 such as SCSI, or through the system bus. The storage controller 20 includes a sequential log 26 and an index structure 28 that maintains an index into the contents and the validity of the data on the sequential log 26. A pointer 30 indicates the current position where data should be next written to the log 26. The storage controller 20 also includes a dedicated processor 32, memory 34 and ASICs 36, which perform functions such as XOR operations and protocol processing. The storage controller 20 is also connected to an array of HDDs 38.

In general, the sequential log 26 modifies the behavior of a regular controller cache for a logical drive, such as a RAID-5 logical drive. During configuration of the RAID-5 logical drive, also referred to as the data drive, a region on all HDDs is earmarked for the sequential log 26. The log region 26 of the HDDs is also organized as a RAID-1 or RAID-5 drive (also referred to as the log drive).

Figure 3:
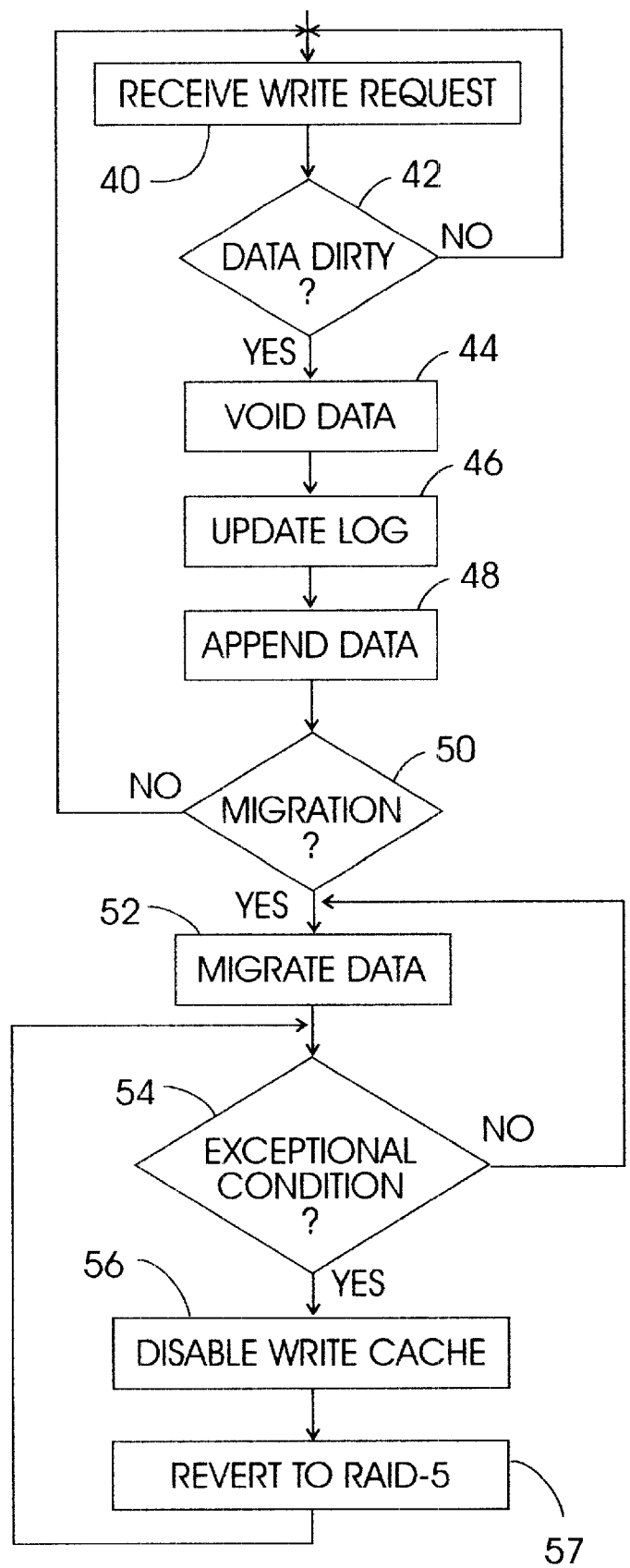
FIG. 3 shows a flow chart of the main steps performed in response to write commands according to an embodiment of the invention.

FIG. 3 shows a flow chart of the overall operation of the data storage control system 16 in accordance with one embodiment of the invention. Initially, a write command is received, as shown in block 40. The system next determines if the data in the log is dirty (obsolete), in decision block 42. If it is, the data is voided, at block 44, and the log is updated 46, as indicated by block 46. The new data is then appended to the log, as shown in block 48. If the data in the log is not dirty the existing data in the log is left and the process reverts back to block 40 to prepare for the next write command. Further details of the log updating process is discussed below and shown in FIG. 4.

Next, the system determines if a migration is appropriate, as shown in block 50. Migration is the transfer of data from the sequential log onto the actual location of the data on the storage controller. Experience with storage subsystems shows that there are periods of inactivity that are long enough to provide time to migrate the data from the sequential log to the actual location of the data. Besides idle periods, there are several other situations where migration may be performed. These include a periodic migration based on an internal timer, migrating when the log gets too large, or migrating when the index structure gets too large.

As shown at block 52, the data is then migrated, which is a process described in more detail below and shown in FIG. 5. In brief, during migration, the storage controller 20 reads data from the log 26, writes data to its actual location, and invalidates the relevant portion of the log in the index structure 34. This continues until there are no valid entries in the log 26.

It is possible that under exceptional circumstances the migration software in the storage controller will not be able to keep up with the rates of writes to the sequential log 26. Such circumstances are detected, as indicated in decision block 54. These circumstances include instances where either the index structure 28, or the log 26, start to go over a predetermined threshold before they overflow. In response to the detection of an exceptional condition, the sequential log 26 is disabled, as shown in block 56, and the storage controller 20 reverts back to conventional RAID-5, as shown in block 57. That is, the writes are directed to their actual location in accordance with the RAID-5 algorithm.

Therefore, there is no performance degradation with the write caching of the present invention. Improved performance will be realized as long as there is some period during which migration can be caught up with. When this is not possible, the system reverts to conventional operation as if the write caching were not present. It should be noted that migration during inactivity (periods of few write requests arriving) may be aggregated, i.e. any dirty data in an entire stripe can be migrated all at once. Data won't become too fragmented because frequent updates are handled by the cache anyway. Log updates are always done sequentially, so that the system never skips over old data, but instead just sweeps around or stops altogether and waits for the next idle period.

In the following discussion, the operation and structure of the invention are discussed in more detail using a preferred embodiment as an illustrative example. In order to facilitate a better understanding of these details, the operation of a conventional storage controller cache memory will be explained. A conventional storage controller cache primarily consists of data pages, a cache directory, and a timer mechanism to trigger cache flush. To simplify this discussion it will be assumed that the size of a page is equal to the stripe unit—the chunk of data in a stripe that maps to one HDD. The number of pages depends on the size of memory available to the controller. Initially, the cache starts out with all pages free, the cache directory empty and the timer disabled. When a host write command is received by the controller, the cache determines the resources required to execute. This is determined by translating the logical block address (LBA) and count in the write command into the number and identities of pages. The command then tries to acquire those pages for its use. A check for the page in the cache directory, which maintains a map between LBAs and pages, shows if there is already a page for the LBA. If not, a page must be allocated and entered in the cache directory. If the page already exists in the cache then the command tries to lock it. If that page is currently held by another command then the write operation is queued to be woken on its turn. When a command has acquired all its cache pages, it notifies the host to send the data. A DMA engine directs the movement of data into the data pages. Once data is received and the cache has verified its contents, the write operation updates a page map. The page map consists of a bit array of the state of each sector in the page for each page held, as well as statistics such as the number of dirty pages in the cache, firing the timer etc. The command then releases all the pages it held and returns the status to the host. Other commands waiting for locked pages are woken and proceed to completion.

When the controller cache begins to become filled, or the timer pops due to inactivity, flush commands are internally generated. Typically, multiple flush commands are generated to control the flush rate. A flush command walks through the list of dirty pages in the cache and picks a page to flush based on an operating policy. Typically, this policy picks the least recently used (LRU) page. Once a page has been chosen, the flush command attempts to collect other pages that might be mapped to the same stripe. This strategy of flushing all pages in a stripe at a time works very well with RAID-5 drives since a lot of parity update work gets amortized over the dirty pages in the stripe. Depending on the size of the flush set (set of pages selected) an appropriate RAID-5 XOR algorithm is selected. The algorithm determines the number of additional pages needed to stage the new parity and old copies of the data and parity. When these additional pages have been acquired and the necessary read operations completed, the flush command acquires a stripe lock for the stripe it will flush data to. Acquiring a stripe lock serves two purposes. First, the stripe lock enforces serialization. Second, since a controller can fail while writing data and parity on HDDs, leaving inconsistent parity, the lock is a record to fix the parity for the stripe on power up before permitting any updates. Holding stripe locks, the flush command performs the necessary XOR operation and writes data and parity to the HDDs. Once those commands are completed successfully, the page maps and statistics are updated and all locks and pages are released. Since these pages contain valid data, they are retained in the cache directory. When a need for fresh pages arises (for a new command) these pages are reclaimed and reused.

When writing data in a RAID-5 drive there is a choice of algorithms available to make the update efficient. These choices are referred to herein as XOR algorithms. Broadly, there are three algorithms—Read-Modify-Write (RMW), Full-XOR (FXOR), and Entire-Stripe-Write (ESW).

The RMW algorithm is used when the number of pages in the stripe to be flushed is less than half the total number of pages in the stripe. The FXOR is the algorithm used when more than half the pages in the stripe are being updated. ESW is the most efficient algorithm. It is only used if all the pages in the stripe are dirty, i.e. all the pages in the stripe are being updated.

The following discussion will illustrate how the present invention operates to maximize the utilization of the ESW algorithm to exploit its inherent efficiency. The conventional RAID-5 logical drive is configured such that a region on all HDDs is set aside for a log. In a preferred embodiment of the invention, the log region 26 is also organized as a RAID-5 drive, although a RAID-1 organization may be used instead. Two counters are maintained by the storage controller 20 that store the logical block addresses (LBAs) of the head and tail of the log. These counters are initialized to the starting LBA of the log drive. Location information for dirty data written to the log drive is maintained in two structures in the index structure 28: a segment map (segmap) and a segment directory. Each segmap describes the location of dirty data for a region of LBAs, called a segment, on the data drive. It is an array of LBA pointers (one per sector in the segment) to sectors in the log drive containing the latest copy. For simplicity of illustration, it is assumed that the segment size is set to the page size, although this is not necessary to practice the teachings of the invention.

An invalid value in the segmap for a sector implies that the copy in the drive is the recent copy. To speed the search for a segment during read and write processing, a segment directory in the index structure 28 maintains a map between segment LBA and segmap. Additionally, each segmap has one lock field and a plurality of link fields. The lock field is set when a command is currently operating on that segment and is cleared when free. The link fields are used to chain the segmap to the segmap immediately succeeding it in the log drive.

Figure 4:
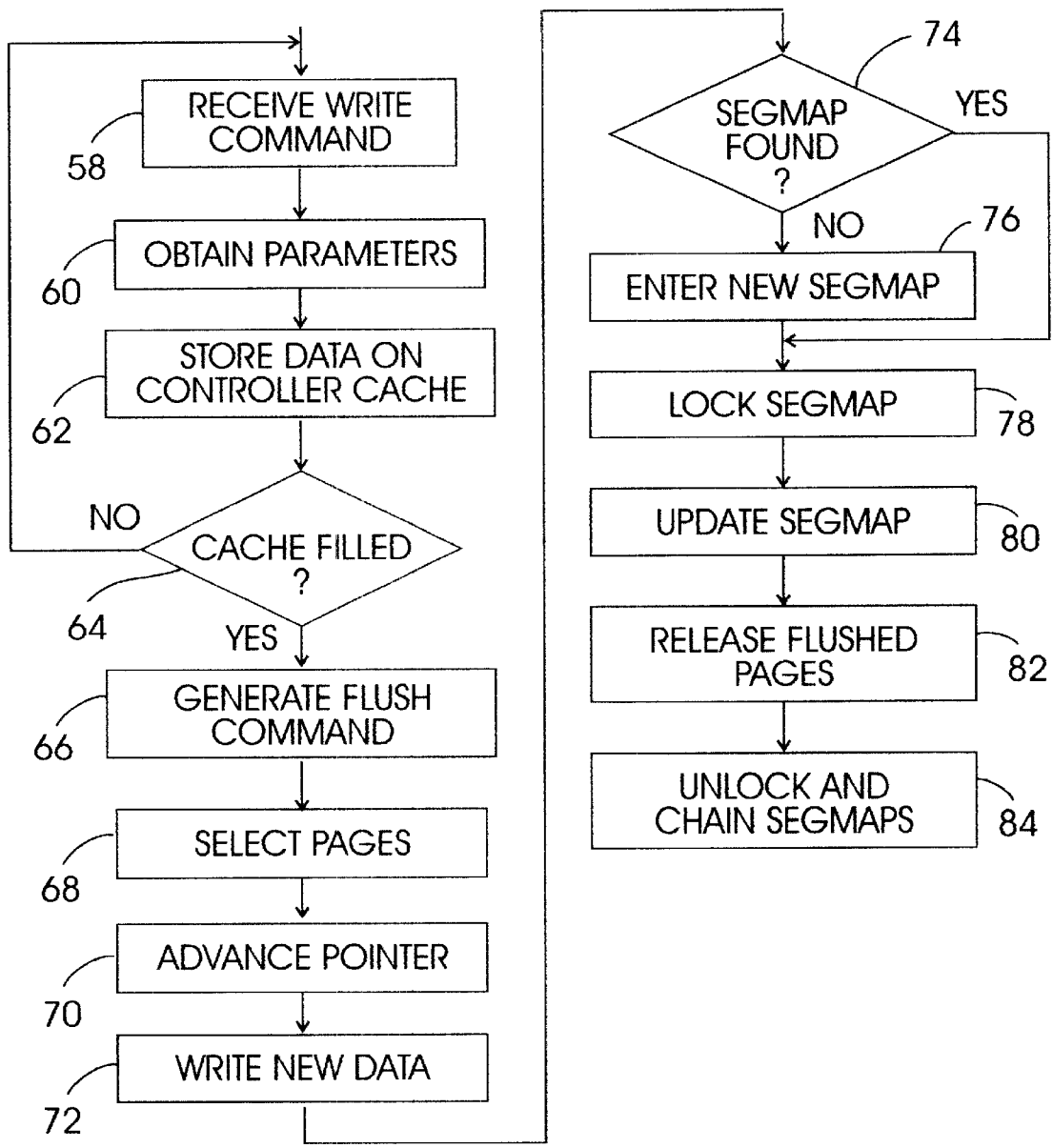
FIG. 4 shows a flow chart of the steps performed during the updating of the sequential log according to an embodiment of the invention.

The operation of the sequential log 26 for a write command received at the storage controller 20 is basically the same as in a conventional cache; the difference lies in the flush command. Referring now to FIG. 4 there is shown a flow chart that includes details of the flush command process in accordance with a preferred embodiment of the invention. Initially, a write command is received, as shown in block 58. The parameters of the write command are obtained as shown in block 60. The write parameters include the logical drive, the offset (LBA), the amount of write data and the data to be written. The RAID level of the logical drive that is the target of the write may be any that is allowed by the storage controller 20. As shown in block 62, the data to be written may then be stored temporarily in a volatile write-through or write-back cache on the storage controller.

In accordance with the invention, the log writes to the cache are optimized by the use of a staging buffer. The process of flushing the log 26 begins with the controller checking to determine whether the sequential log is filled with dirty pages, or if a timer has popped, as shown in block 64. If not, the process returns to block 58, since the existing data is not obsolete. If the cache is filled with dirty pages, internal flush commands are started, as indicated in block 66. Each flush command picks as many pages as needed to write an entire stripe's worth of dirty data, as shown in block 68. The number of pages is selected according to the policy in effect, e.g. Last Recently Used (LRU), as well as other pages, if they exist, for that stripe. Once this set of pages is selected, log space is allocated for the write by advancing the head pointer of the log, as shown in block 70. The flush command then performs the log write for a stripe's worth of dirty data, as shown in block 72. As indicated in block 74, when the log write is successful, the flush command searches the segment directory for segmaps for each flushed page. If it is not found, then a new segmap is allocated and entered into the segment directory, as shown in block 76, and the segmap is locked, as shown in block 78. The segmap is then updated to store the LBA on the log drive where the data was written for every dirty sector in each flushed page, as shown in block 80. Once completed, the flush releases all the flushed pages, at block 82 and then unlocks and chains the segmaps according to the ascending order of the smallest entry in the segmap, as indicated in block 84.

Figure 5:
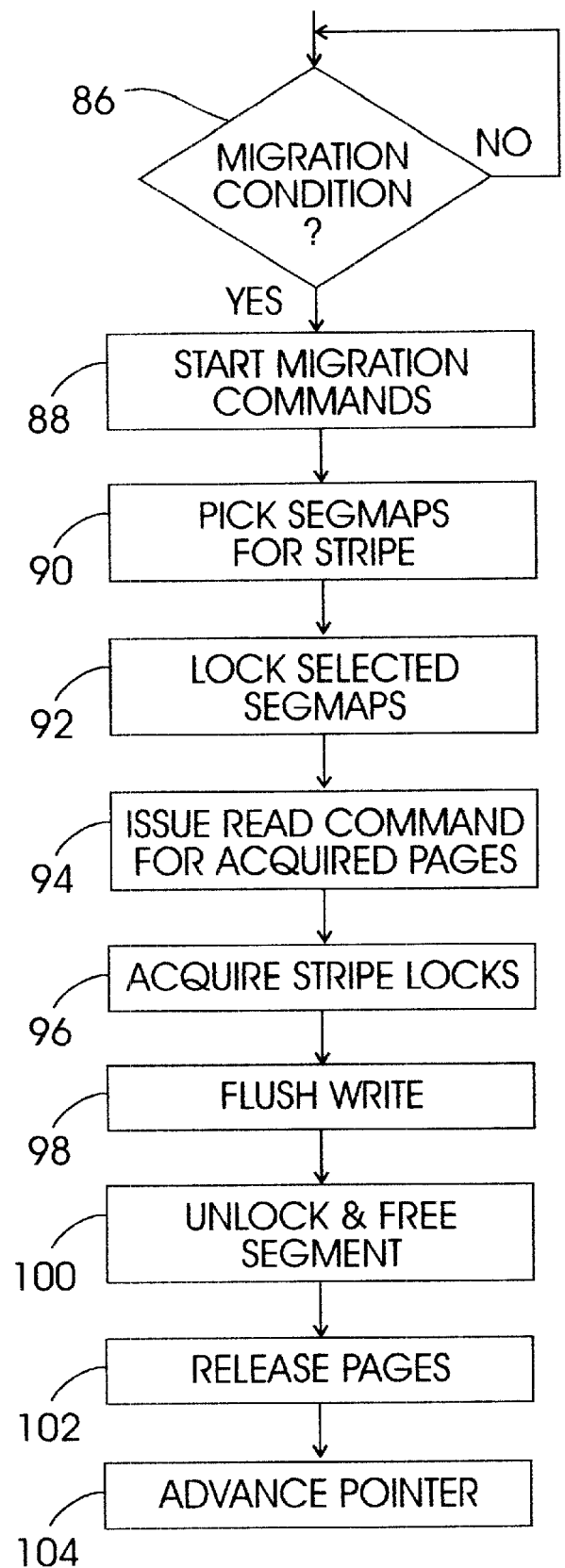
FIG. 5 shows a flow chart illustrating the steps performed during the migration of data from the sequential log to the HDDs according to an embodiment of the invention.

Referring to FIG. 5, the sequential log 26 continues in the above manner until migration is indicated, as shown in block 86. Migration may occur when an idle period is detected (defined as a period of few write requests coming in), or when the log is too large, or when the index structure 28 is too large, or after a predetermined period of time. As shown in block 88, the sequential log 26 then starts migration commands internally. Each migration command starts at the tail of the segmap list and picks all segmaps for a stripe, as shown in block 90. The selected segmaps are then locked, at block 92, and a read command is issued for the acquired pages, as shown in block 94. Stripe locks are then acquired, at block 96, and a flush and write is performed, as shown in block 98. The segment is then unlocked and freed, at block 100, the held pages are released, at block 102, and the tail pointer of the log is advanced, as shown in block 104. The rate of migration is controlled by limiting the number of concurrent migration commands at any time. No new migration commands are started if the load at the controller picks up.

Improved throughput and response times for write (and read) commands under peak load conditions are achieved by the present invention due to its ability to exploit the efficiency of the ESW algorithm. In a conventional cache where dirty pages corresponding to random locations on a RAID-5 drive, the probability that the flush commands for such pages will employ RMW is very high. In this situation, FXOR is the next likely algorithm to be used and ESW will only be rarely used. Consequently, the flush rate is primarily determined by the time to complete RMW operations. Furthermore, since RMW needs about double the number of flush pages, there is contention for additional pages in the cache leading to fewer concurrent flushes. Under such conditions, the service rate (throughput) of a conventional cache becomes limited by the flush rate, which uses RMW, the least efficient of all of the algorithms.

The present invention maximizes the utilization of the ESW algorithm because, by using a staging buffer, dirty data to be flushed out is coalesced into large sequential writes to the sequential log 26. Hence, the probability that such a large (ideally aligned and equal to the stripe in size) sequential write will employ ESW is high. Consequently, the flush operation is very efficient, increasing the service rate of the sequential log 26. Another advantage of the invention is that since dirty data is coalesced from many pages and flushed at one time, each flush command frees up more pages that are subsequently available for reuse. This reduces the wait times for pages and consequently the response times for new commands. Under peak load conditions, with sufficient log space, the cache becomes limited by the flush rate, which uses the more efficient ESW algorithm. The result is superior performance over the conventional RAID-5 cache during peak load conditions.

It should be noted that there is more work to be done after flushing to log in the sequential log of the present invention. The migration activity increases the total amount of work since data now needs to be read back into the cache and then written to the original location in the array. There is a high probability that RMW is employed during migration. In effect, the write and read to/from the log is the extra work done by the sequential log of the present invention. However, since much of this work is done during off-peak periods, when there is spare capacity, the host does not experience the effects of this additional work. In essence, just like a conventional cache defers a big chunk of the work during a write to a later time (during a flush), the present invention sequential log defers a larger chunk of the work during a flush to a later time (during migration).

The performance gains of the present invention do come at a price: (1) controller memory is required to store the segmaps and the segment directory; (2) log space on the HDDs is required; (3) the path length of host read and write processing is longer since the segment directory must be searched; (4) migration requires additional processing cycles; (5) the time to quiesce (when all activities in a controller have ceased) is longer due to migration; and (6) migration causes cache pollution since it retrieves data back from the log. In most applications, these drawbacks will not be significant.

In addition, the sequential log 26 of the present invention can run into a state where there is insufficient resources to continue normal operation. The two resources that become scarce during extended operations are the segmaps and log space. Segmaps are allocated in the storage controller memory 34, while log space is allocated in the array as part of the RAID-5 configuration. Between these two, segmaps are a more limited resource since memory on a controller is more expensive than disk space. Furthermore, even when the storage controller 20 has sufficient memory for the segmaps, there will be situations when the cache runs out of free segmaps to allocate for new flush commands. A similar situation can arise if there is insufficient log space. In either case, the sequential log 26 needs to modify its flush behavior if it must continue to service new commands.

The flush modification is accomplished by disabling the sequential log 26 and converting to an exceptional mode of operation, as shown in FIG. 3. The storage controller 20 then begins operating like a conventional write cache and instead of writing to the log drive first, the flush command writes directly to the locations on the data drive. One difference between the flush command when the storage controller 20 is in exceptional mode and a conventional cache, is that in the exceptional mode every flush command searches the segmap directory for segmap entries for the pages it holds to flush. If the command finds segmaps for any of the pages then it updates them—making invalid the LBA pointers in the segmap for every dirty sector in the page. This ensures that a subsequent read of these sectors leads to access from the data drive instead of the log drive. When in exceptional mode, the sequential log 26 does not add new segmaps nor use log space. It operates in this mode until sufficient segmaps and/or log space has been freed up by the ongoing migration. A threshold is set, below which the cache resumes its normal operation.

Two other situations may affect the operation of the storage controller 20 of the present invention. One is read fragmentation and the other is the misalignment of the log write. Read fragmentation occurs when a host read operation requests data that partially or completely spans data that is presently in the log drive. In a conventional cache, the read operation, on a cache miss, will result in a signal read to the RAID-5 drive. In the present invention, under certain circumstances, the same host read could result in multiple reads, some to the log drive and some to the data drive. This fragmentation of read makes the operation slower with higher overheads. The circumstances under which a read gets fragmented is when the host submits read requests to data that are still in the log drive, that is, they have not yet been migrated. Every read command in the present invention checks the segment directory to note if there is a need to fragment the read if there is no entry in the directory, then the read proceeds as in a conventional cache. However, if a segmap entry exists, then the read is directed to valid LBA pointers in the segmap. This check is done for every segmap overlapping the read request.

Misalignment of the log write can also occur. In normal operation, it is unlikely that the flush to the log drive will always employ ESW. As long as there is exactly enough data to fill an entire stripe, ESW can be employed. However that seldom occurs for two reasons—(1) pages are, in general, never partially flushed thus making it hard to match exactly one strip's worth of dirty data, and (2) there can be, at times, insufficient dirty data to fill and entire stripe. During operation, at some point, a write to the log will lead to the head pointer being misaligned with the stripe. Once that occurs, subsequent log writes cannot employ ESW, and instead will use FSOR, and sometimes RMW. This will continue until the head pointer realigns with the stripe.

One solution to this problem is to pad the log writes with spurious data to ensure an ESW operation. Whenever the write to the log is more or less than a stripe size the dirty data is itself used (tiled) to pad it to the nearest stripe size. This imposes no significant additional work for the controller since the XOR and protocol processors all accept scatter-gather input lists. The spurious data inserted is never read since no entry is make for it in the segmaps. When the segment is migrated and the segmap reclaimed the log space is reclaimed freeing up the space used by the spurious data. This solution ensures that the head pointer is always aligned with the stripe and therefore an ESW is always employed.

While the particular SYSTEM AND METHOD FOR A LOG-BASED NONVOLATILE WRITE CACHE IN A STORAGE CONTROLLER as herein shown and described in detail is fully capable of attaining the above-described objects of the invention, it is to be understood that it includes the presently preferred embodiments of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for" or "steps for".

We claim:

1. A computer-implemented method for storing information on a data storage medium comprising:

receiving a write command containing data in a data storage controller, the data storage controller including a write cache having a sequential log, the data storage controller also including an index structure indicating the location of data in the sequential log;

determining if the data already exists on the log, and if not, writing the data on the log contained in the write cache at a location recorded in the index structure;

if the data already exists on the log as indicated by the index structure, invalidating the data on the index structure and writing the new data on the log at an available location determined by the index structure; and determining if a migration condition exists, and if so, transferring data in the log from a plurality of write commands to the data storage medium.

2. The method of claim 1 further comprising the step of advancing a pointer on the index structure to the next location on the log after data is written to the log.

3. The method of claim 1 wherein the data storage medium is an array of Hard Disk Drives (HDDs).

4. The method of claim 3, wherein the step of transferring data from the log to the HDDs is according to a RAID-5 configuration.

5. The method of claim 4, wherein the log is stored on HDDs and is organized according to a predetermined level of a RAID configuration.

6. The method of claim 5 further including the step of determining if an exceptional condition exists and if so, disabling the write cache and bypassing the write cache when storing data in response to a write request.

7. The method of claim 6 wherein the step of determining if an exceptional condition exists includes either the step of determining if the available memory space in the storage controller for the index structure is below a predetermined threshold, or determining if the available memory space for the log in the write cache is below a predetermined.

8. The method of claim 1 wherein the step of determining if a migration condition exists includes at least one of the following steps: the frequency of the receipt of write requests is below a predetermined threshold, or the amount of data in the log is above a predetermined threshold, or the amount of data in the index structure is too large, or a predetermined period of time has elapsed.

9. The method of claim 1 wherein the step of receiving the write command includes the steps of obtaining the parameters of the write command, including the logical drive, the offset, and the amount of data to be written.

10. The method of claim 1 wherein the step of receiving the write command includes the step of temporarily storing the data in the write command in either a volatile write-through or a write-back cache prior to the transfer of the data to the write cache containing the log.

11. The method of claim 1 wherein the write cache is a non-volatile write cache.

12. The method of claim 1 further comprising the step of transferring the data in the write command to a staging buffer to optimize writes to the log in the write cache.

13. A system for storing information on a data storage medium comprising:
   data controller including a write cache having a sequential log, the data controller also including an index structure indicating the location of data in the sequential log;
   means for receiving a write command containing data;
   means for determining if the data already exists on the log, and if not, writing the data on the log at a location recorded in the index structure;
   means for invalidating the data on the index structure and writing the new data on the log at an available location determined by the index structure if the data already exists on the log as indicated by the index structure; and
   means for determining if a migration condition exists, and if so, transferring data in the log from a plurality of write commands to the data storage medium.

14. The system of claim 13 further comprising a pointer on the index structure, which is advanced to the next location on the log after data, is written to the log.

15. The system of claim 13 wherein the data storage device is an array of Hard Disk Drives (HDDs).

16. The system of claim 15, wherein the data on the HDDs is organized according to a RAID-5 configuration.

17. The system claim 13, wherein the log is stored on HDDs and is organized according to a predetermined level of a RAID configuration.

18. The system of claim 13 further including means for determining if an exceptional condition exists and if so, disabling the write cache and bypassing the write cache when storing data in response to a write request.

19. The system of claim 18 wherein the means for determining if an exceptional condition exists includes means for determining if the available memory space in the storage controller for the index structure is below a predetermined threshold, or if the available memory space for the log in the write cache is below a predetermined.

20. The system of claim 13 wherein the means for determining if a migration condition exists determines at least one of the following conditions: the frequency of the receipt of write requests is below a predetermined threshold; the amount of data in the log is above a predetermined threshold; the amount of data in the index structure is too large; or a predetermined period of time has elapsed.

21. The system of claim 13 further comprising ether a volatile write-through or a write-back cache for temporarily storing data in the write command prior to the transfer of the data to the write cache containing the log.

22. The system of claim 13 wherein the write cache is a non-volatile cache.

23. The system of claim 13 further comprising a staging buffer receiving the data in the write command to optimize writes to the log in the write cache.

24. The system of claim 13 wherein the index structure includes a segment map and a segment directory which maintain location information for data written to the log drive.

25. The system of claim 24, wherein the segment map includes lock fields that are set when a write command is currently operating.

26. The system of claim 24 wherein segment map includes link fields that chain the segment map to a segment map immediately succeeding it in the log drive.

27. A computer program product, comprising:
   a computer program storage device;
   computer-readable instructions on the storage device for causing a computer to undertake method acts to facilitate the storing of data on a data storage medium by a data storage controller, the method acts comprising:
   receiving a write command containing data in the data storage controller, the data storage controller including a write cache having a sequential log, the data storage controller also including an index structure indicating the location of data in the sequential log;
   determining if the data already exists on the log, and if not, writing the data on the log contained in the write cache at a location recorded in the index structure;
   if the data already exists on the log as indicated by the index structure, invalidating the data on the index structure and writing the new data on the log at an available location determined by the index structure; and
   determining if a migration condition exists, and if so, transferring data in the log from a plurality of write commands to the data storage medium.

* * * * *